(12) United States Patent
Childress et al.

(10) Patent No.: US 10,402,894 B2
(45) Date of Patent: Sep. 3, 2019

(54) AUTOMATED SERVICE REQUEST SYSTEM

(71) Applicant: INTERNATIONAL BUSINESS MACHINES CORPORATION, Armonk, NY (US)

(72) Inventors: Rhonda L. Childress, Austin, TX (US); Kim A. Eckert, Austin, TX (US); Ryan D. McNair, Austin, TX (US); Minh Q. Pham, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 452 days.

(21) Appl. No.: 15/208,005

(22) Filed: Jul. 12, 2016

(65) Prior Publication Data
US 2018/0018718 A1 Jan. 18, 2018

(51) Int. Cl.
*G06Q 30/00* (2012.01)
*G06Q 30/06* (2012.01)
(Continued)

(52) U.S. Cl.
CPC ..... *G06Q 30/0639* (2013.01); *G06Q 30/0281* (2013.01); *G06Q 30/0631* (2013.01); *H04L 67/10* (2013.01); *H04L 67/22* (2013.01); *H04L 67/306* (2013.01); *H04W 4/023* (2013.01); *H04W 4/027* (2013.01); *G06Q 30/0641* (2013.01)

(58) Field of Classification Search
CPC ............. G06Q 30/0281; G06Q 30/0601–0645
USPC ................................................ 705/26.1–27.2
See application file for complete search history.

(56) References Cited

U.S. PATENT DOCUMENTS 8,639,410 B1 1/2014 Billman
8,750,902 B2 6/2014 Xiao et al.
(Continued)

FOREIGN PATENT DOCUMENTS

CA 2710117 A1 4/2011

OTHER PUBLICATIONS

Lin, C., & Hung, M. (2014). A location-based personal task reminder for mobile users. Personal and Ubiquitous Computing, 18(2), 303-314. doi:http://dx.doi.org/10.1007/s00779-013-0646-2 (Year: 2014).*

(Continued)

*Primary Examiner* — Resha Desai
*Assistant Examiner* — Kennedy Gibson-Wynn
(74) *Attorney, Agent, or Firm* — William H. Hartwell; Andrew D. Wright; Roberts Mlotkowski Safran Cole & Calderon, P.C.

(57) ABSTRACT

A computer-implemented method includes: monitoring, by a user device, a location of the user device; determining, by the user device and based on the monitoring, that the user is within a threshold distance or a threshold arrival time of the service provider location; and outputting, by the user device, user information to the service provider based on the determining that the user is within the threshold distance or the threshold arrival time of the service provider location. The user information indicates services to provide to the user by the service provider upon the user's arrival to the service provider location. The outputting causes the service provider to receive the user information for serving the user upon the user's arrival to the service provider location.

20 Claims, 8 Drawing Sheets

(51) Int. Cl.
*G06Q 30/02* (2012.01)
*H04W 4/02* (2018.01)
*H04L 29/08* (2006.01)

(56) References Cited

U.S. PATENT DOCUMENTS

| | | | | |
|---|---|---|---|---|
| 2003/0149576 A1* | 8/2003 | Sunyich | ............... | G06F 17/60 |
| | | | | 705/1 |
| 2010/0191551 A1* | 7/2010 | Drance | ............... | G06Q 10/00 |
| | | | | 705/5 |
| 2011/0103564 A1* | 5/2011 | Couse | ............... | H04M 3/42 |
| | | | | 379/201.03 |
| 2012/0115512 A1 | 5/2012 | Grainger et al. | | |
| 2014/0171097 A1 | 6/2014 | Fischer et al. | | |
| 2014/0207499 A1* | 7/2014 | Fliess | ............... | G06Q 50/12 |
| | | | | 705/5 |
| 2015/0242911 A1* | 8/2015 | Zises | ............... | G06Q 50/26 |
| 2017/0201858 A1* | 7/2017 | Li | ............... | G07B 15/04 |
| 2017/0278201 A1* | 9/2017 | Mimassi | ............ | H04M 1/2535 |
| | | | | 379/201.03 |
| 2017/0330299 A1* | 9/2017 | Schmidt-Karaca | .... | G06Q 50/26 |
| 2017/0301149 A1* | 10/2017 | Shafran | ............... | G07B 15/04 |

OTHER PUBLICATIONS

Phillips, Y!kes! Proximity awareness tech startup is making life simpler, http://techpoint.org/2015/06/ykes-proximity-awareness-tech-startup-is-making-life-simpler, Accessed on Feb. 26, 2016, 6 pages.
"Proxce Simplifies Mobile Check-In for Hotels", http://www.hospitalitynet.org/news/4069841.html, Accessed on Feb. 26, 2016, 2 pages.
"BSafe—The End of Worry", http://getbsafe.com/, accessed on Feb. 26, 2016, 3 pages.
"Bugle—A free notification service for active people", http://www.gobugle.com/, Accessed on Feb. 26, 2016, 2 pages.
Mell et al., "The NIST Definition of Cloud Computing", NIST, Special Publication 800-145, Sep. 2011, 7 pages.
Safetipin, http://safetipin.com/, Accessed Jul. 12, 2016, 5 pages.

* cited by examiner

FIG. 7 of the user upon the user's arrival to the location or facility of the service provider. The program instructions are stored on the computer readable storage medium for execution by the CPU via the computer readable memory.

AUTOMATED SERVICE REQUEST SYSTEM

BACKGROUND

The present invention generally relates to automated service request systems and, more particularly, to automated service request systems based on user location.

Hotel providers typically provide luggage assistance services, wheelchair services, and/or other types of services for hotel guests. Upon check-in, hotel staff may be unprepared to receive guests, as guest arrival times can be unpredictable. Thus, hotel services may be delayed upon a guest's arrival. For example, hotel staff may be unavailable or unprepared to assist an arriving guest with luggage, escorting to the hotel facility, wheelchair/other medical accommodation, etc. Delays in providing assistance to hotel guests can be inconvenient for the guest, and may diminish customer satisfaction.

SUMMARY

In an aspect of the invention, a computer-implemented method comprises: monitoring, by a user device, a location of the user device; determining, by the user device and based on the monitoring, that the user is within a threshold distance or a threshold arrival time of the service provider location; and outputting, by the user device, user information to the service provider based on the determining that the user is within the threshold distance or the threshold arrival time of the service provider location. The user information indicates services to provide to the user by the service provider upon the user's arrival to the service provider location. The outputting causes the service provider to receive the user information for serving the user upon the user's arrival to the service provider location.

In an aspect of the invention, there is a computer program product for providing a service to a user upon the user's arrival to a service provider location. The computer program product comprises a computer readable storage medium having program instructions embodied therewith, the program instructions executable by a user device to cause the user device to: monitor a location of the user device; determine, based on the monitoring, that a user of the user device is en route to a service provider; and output user information to the service provider based on the determining that the user is en route to the service provider. The user information indicates services to provide to the user by the service provider upon the user's arrival to a location or facility of the service provider, and the outputting causes the service provider to receive the user information and generate a service list based on the user information.

In an aspect of the invention, a system comprises: a CPU, a computer readable memory and a computer readable storage medium associated with a computing device; program instructions to receive user information from a user device, wherein the user information indicates services to provide to the user by a service provider upon the user's arrival to a location or facility of the service provider, wherein the information is received when the user device is within a threshold distance or a threshold arrival time of the location or facility of the service provider; program instructions to generate a suggested service list based on the user information; program instructions to output the suggested service list to the user device; program instructions to receive selected services based on outputting the suggested service list; program instructions to display or output the user information or the receive selected services for serving

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to automated service request systems and, more particularly, to automated service request systems based on user location. Aspects of the present disclosure may include systems and/or methods that automatically notify a service provider (e.g., staff personnel of a hotel, restaurant, medical facility, etc.) of the impending arrival of a user (e.g., a guest, customer, patron, etc.). Further, the systems and/or methods may provide the service provider with information regarding the user based on which a personalized service list may be generated for the user. For example, a service provider (e.g., a hotel staff) may be notified of the impending arrival of a user (e.g., a hotel guest) using geofencing techniques that notify the service provider when the user's user device (e.g., mobile phone, tablet, etc) is within a threshold distance or threshold arriving time of the service provider's facility (e.g., as the user is en route to the service provider's facility or location). Further, a service provider computing system may receive user information, and generate a service list based on the user's information. As described herein, user information may include the user's name, preferences, requested services, hotel reservation information, etc.

As an example, the service provider computing system may generate a service list that indicates services to provide the user upon the user's arrival to the service provider's facility. Example services may include luggage assistance for a particular number of bags, disability services, providing wheelchair/scooters, providing strollers for children, escorting or accompanying the user from a parking lot to the hotel facility, vehicle parking services, premium or upgraded hotel room or other services, etc. The service provider computing system may provide the service list to service provider personnel such that the personnel may assist the user as indicated in the service list. In embodiments, the personnel may receive the user's location from the user's user device in order to better assist the user.

As described herein, the user may be provided with an opportunity to customize the service list, or cancel/prevent a service request from being processed. For example, after receiving the user's information, the service provider computing system may provide the service list to the user device. The user device may display the list of services, and may provide a user interface that permits the user to modify the list of services, confirm the services, or deny the services altogether.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
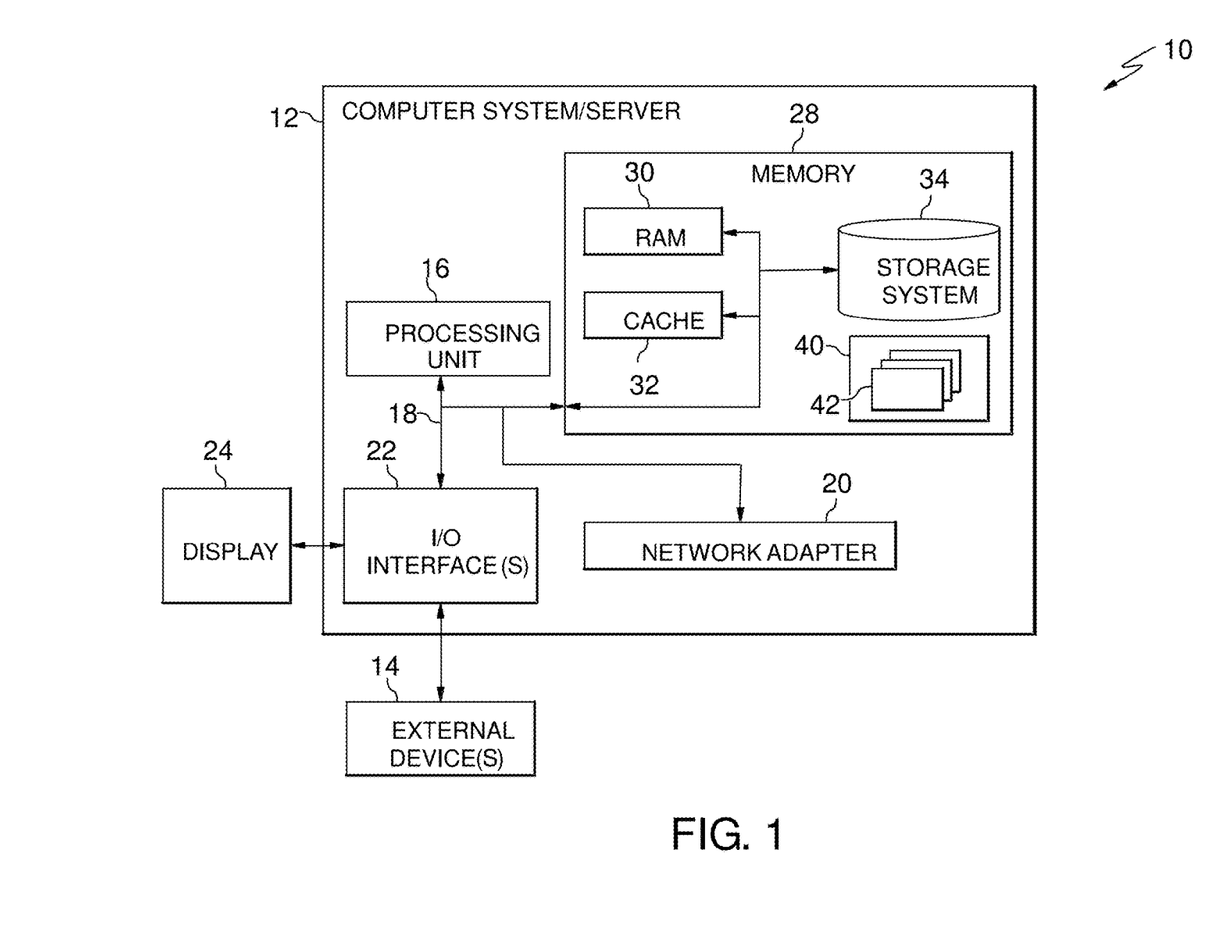
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
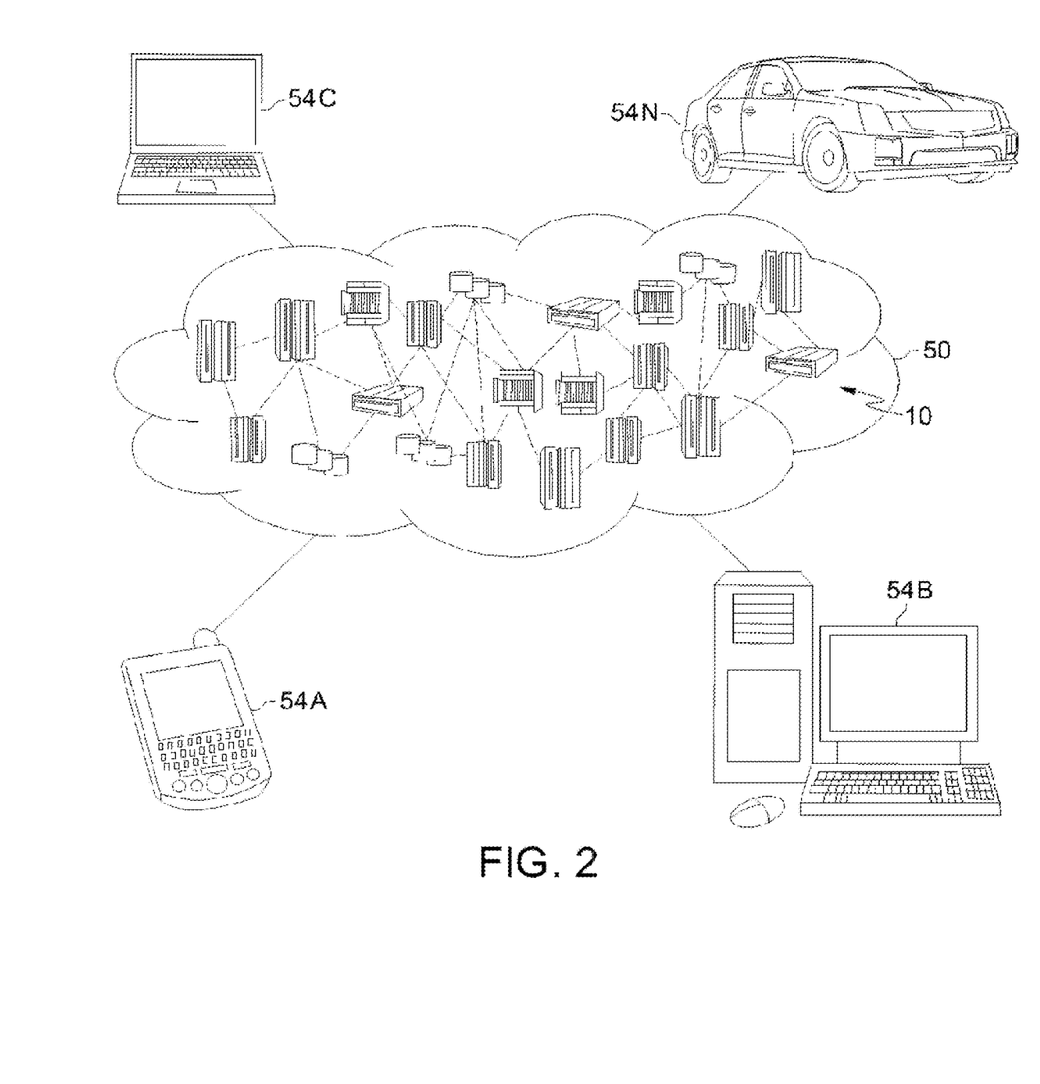
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
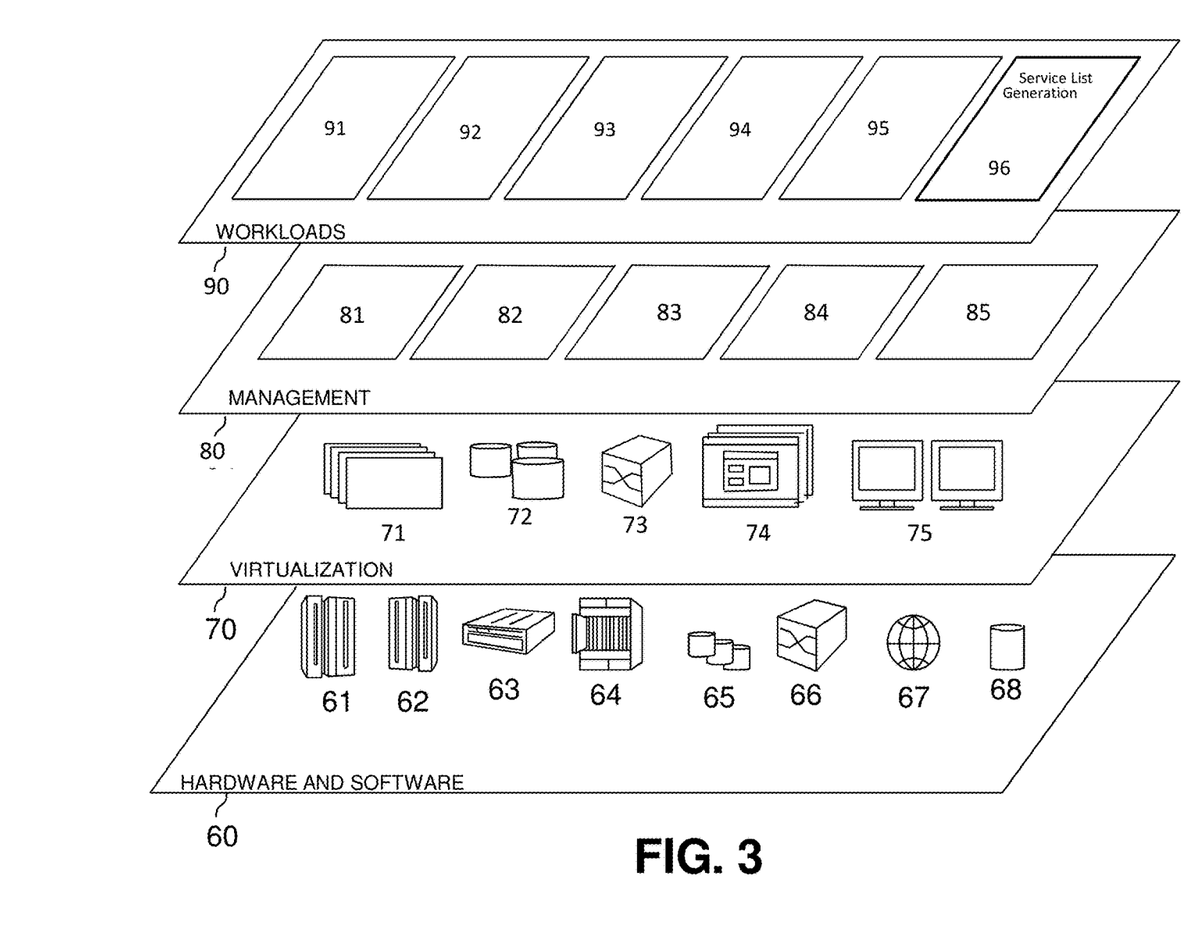
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service list generation 96.

Referring back to FIG. 1, the Program/utility 40 may include one or more program modules 42 that generally carry out the functions and/or methodologies of embodiments of the invention as described herein, such as the functionally of service list generation 96 of FIG. 3. Specifically, the program modules 42 may receive user information, generate a service list based on the user information, and display user information and selected services for service provider personnel. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be implemented in a service provider computing system as shown in FIG. 4A.

Figure 4A:
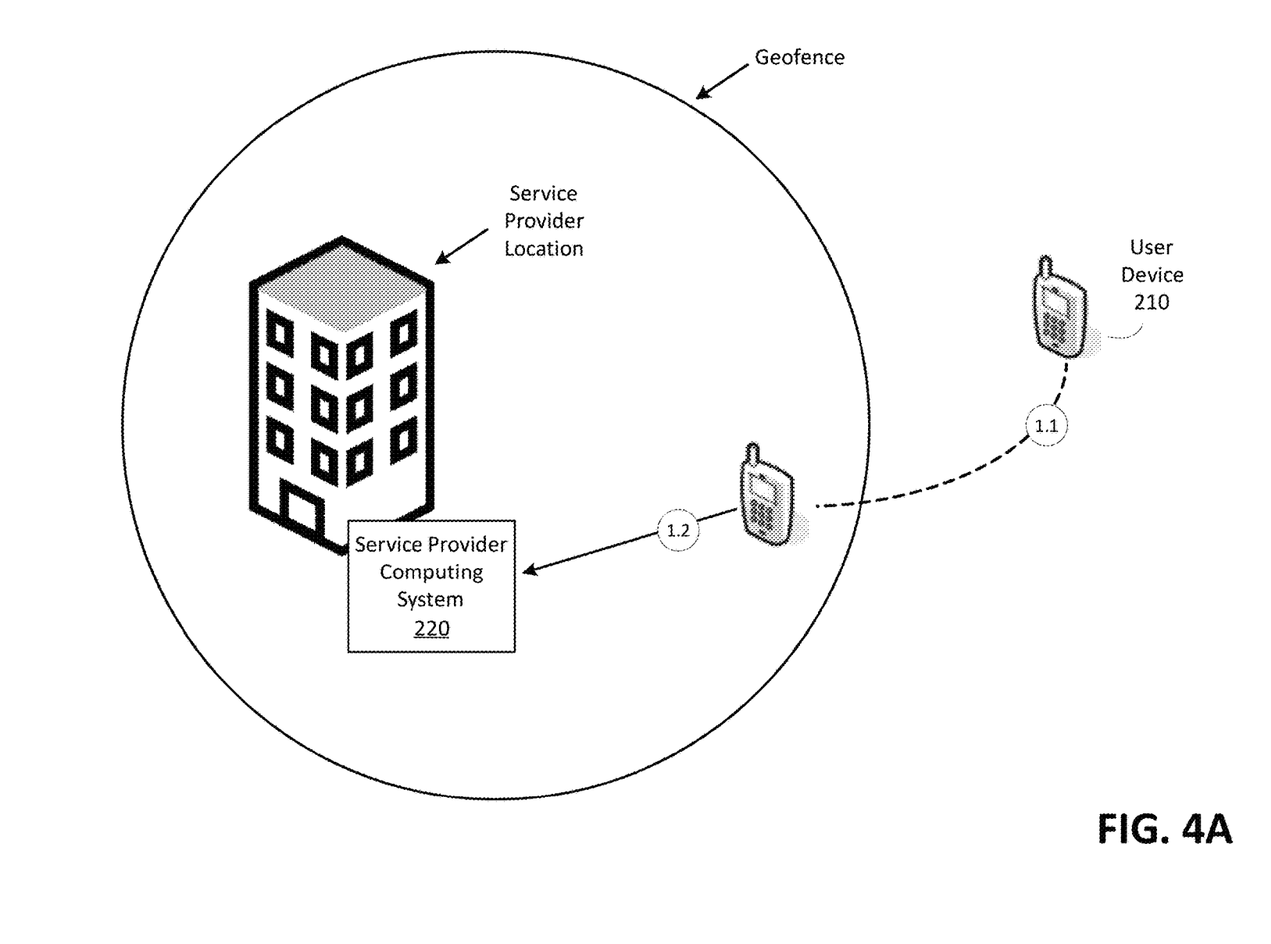
FIGS. 4A and 4B show an overview of an example implementation in accordance with aspects of the present invention.
Figure 4B:
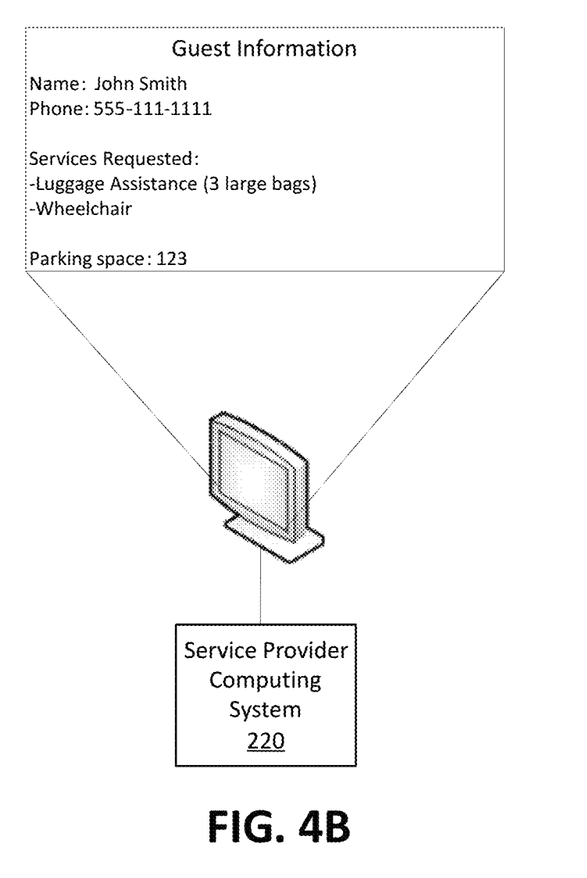

FIGS. 4A and 4B show an overview of an example implementation in accordance with aspects of the present invention. As shown in FIG. 4A, a geofence may be defined around a service provider location. The geofence may be user configurable and may be represented as a threshold radius distance from the service provider location, or as a threshold arrival time from the service provider location. As shown in FIG. 4A, a user device 210 may enter into the geofence (at step 1.1). For example, a user of the user device 210 may enter into the geofence as the user approaches the service provider location. The user device 210 may monitor a location of the user device 210 using, for example, global position system (GPS) techniques. The user device 210 may determine that the user device 210 has entered to within the geofence. Based on entering within the geofence, the user device 210 may output user information to a service provider computing system 220 (at step 1.2). For example, as described herein, the user information may identify the user, historical services requested by the user, services selected or requested by the user, etc.

As shown in FIG. 4B, the service provider computing system 220 may display the user's information in addition to a service list (e.g., requested services). In the example of FIG. 4B, the service list may include luggage assistance for 3 large bags, and a request for a wheelchair. The service provider computing system 220 may also display the user's parking space. For example, the service provider computing system 220 may communicate with an external parking assignment system to obtain an assigned parking space for the user. Additionally, or alternatively, the user may manually provide parking information in the event that the user has made previous parking arrangements. The parking information may be used by service provider personnel to greet the user at the user's parking location. The information shown in FIG. 4B may be printed or provided to a mobile device of service provider personnel such that the personnel can easily identify the requested services to provide to the user upon the user's arrival. Further, management personnel may use the information to arrange for the services to be provided (e.g., by assigning the appropriate personnel and resources required to fulfill the listed services).

While the above example is described in terms of a hotel as a service provider, the systems and/or methods, described herein, may be applied for other types of service providers (e.g., emergency medical service providers, restaurants, event venues, etc.). For example, emergency medical service providers may be notified when a patient is within a threshold distance of the emergency medical service facility and, in turn, receive the patient's information (unless the user denies service). In this way, emergency medical service providers may be better prepared to receive the patient. In embodiments, a determination may be made that a user is a medical patient based on the user's location. Further, the user may provide a confirmation that the user is a patient seeking medical attention. As another example, restaurant staff may receive an indication that customer is arriving at the restaurant facility, and may receive a request for a particular service (e.g., a birthday greeting service). In this way, the restaurant is prepared to greet the customer upon arrival and provide the requested service.

In embodiments, the user's information may be stored in a user profile, and the user information may be based on prior user activity (e.g., prior services obtained by the user), public user information from the user's social media account, and/or information manually entered by the user (e.g., specific requested services). In embodiments, the user information may be obtained from one or more cloud-based external databases. In embodiments, the user's medical records may be used with the user's expressed permission (e.g., so that medical related accommodations and services may be provided, such as medical equipment, oxygen tanks, walkers, wheelchairs, etc.).

In embodiments, one user's profile may be combined with another user's profile. For example, if user A frequently travels with user B, the profiles for user A and user B can be linked such that the preferences of both users are accommodated upon the arrival of user A and user B. In embodiments, multiple user profiles may be linked when user devices associated with multiple users are within close proximity. For example, user device A may detect that user device B is within close proximity of user device A using a Bluetooth radio, near field communications (NFC) radio, and/or other technique. Based on detecting that user device A and B are within close proximities, the profiles for user A and user B may be linked. The linked profiles may be sent to the service provider computing system such that the culmination of services for all users in a party can be provided for the entire party upon the party's arrival (e.g., when the party is traveling in the same vehicle or convoy).

In embodiments, the user device may include a specialized application that notifies the service provider computing system of the user's location when the user device is within a threshold distance or arriving time of the service provider facility. The application may provide the user information, user requested services, and/or other information to the service provider computing system based on which the service provider computing system may generate a service list for the user. The application may include a user interface via which the user may confirm, modify, or deny the service list. The application may also provide the user's location to the service provider computing system. Additionally, or alternatively, the application may include an estimated time of arrival (ETA) of the user to the service provider facility, and the ETA may be updated based on traffic conditions, etc. In embodiments, the application may be used to link multiple user profiles. For example, the application may allow user A to designate user B as a traveling companion. Further, the application may determine that multiple users are within close proximity and, in turn, may link user profiles. In an alternative embodiment, the application may notify the service provider computing system of the user's location when the user device is within a threshold distance or arriving time of the service provider facility and when the user is stopped for a threshold amount of time.

In embodiments, the service provider computing system may register to offer services to users. For example, the service provider computing system may register to receive information regarding the arrival of users. Further, the service provider computing system may register other devices (e.g., user devices of service provider personnel) to receive the user information and notifications of user arrival.

In embodiments, individuals may also be service providers. For example, individuals or groups of individuals may register as service providers, and may register the types of services that they are able to provide (and associated fees). A calendar invite scheduling system may be used by a requesting user to request services from a group of nearby individual service providers. When a user who needs assistance arrives at a target location, a notification may be sent to all nearby available individual service providers announcing the user's location and the type of assistance needed. To prevent confusion and unnecessary extra help, acceptance of a task can be communicated (e.g., via an "Accept" button) so that everyone in a group of individual service providers stay informed of the most up-to-date request status.

Figure 5:
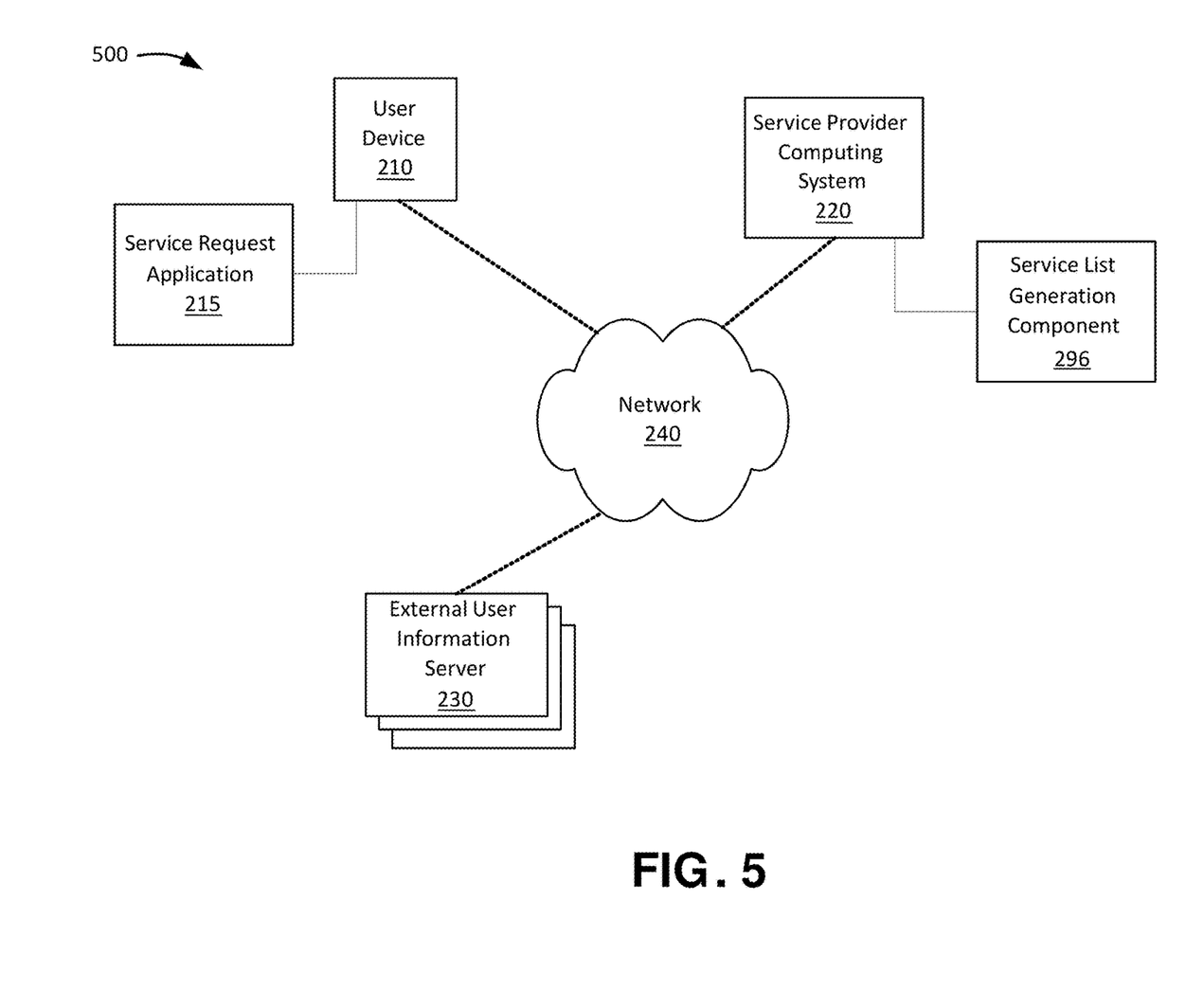
FIG. 5 shows an example environment in accordance with aspects of the present invention.

FIG. 5 shows an example environment in accordance with aspects of the present invention. As shown in FIG. 5, environment 500 may include a user device 210, a service provider computing system 220, a external user information server 230, and/or network 240. In embodiments, one or more components in environment 200 may correspond to one or more components in the cloud computing environment of FIG. 2.

The user device 210 may include a computer device capable of communicating via a network, such as the network 240. For example, the user device 210 may correspond to a mobile communication device (e.g., a smart phone or a personal digital assistant (PDA)), a portable computer device (e.g., a laptop or a tablet computer), or another type of device. As shown in FIG. 5, the user device 210 may include a service request application 215 that implements one or more of the processes described herein in connection with notifying a service provider of a user's arrival to a service provider location, and providing user information. For example, the service request application 215 may monitor a location of the user device 210, detect that the user device 210 is within a threshold distance or arrival time of a service provider location, and output user information to a service provider computing system 220 based on detecting that the user device 210 within the threshold distance. Further, the service request application 215 may receive a suggested service list, and may receive selections (e.g., from a user of the user device 210) to confirm or modify the suggested service list.

The service provider computing system 220 may include one or more computing devices, displays, etc., running a service list generation component 296 that implements one or more of the processes described herein. For example, the service provider computing system 220 may comprise the computer system/server 12 of FIG. 1 and the service list generation component 296 may comprise a module 42 of FIG. 1. In embodiments, the service list generation component 296 may receive notifications regarding the impending arrival of a user (e.g., when the user's user device 210 enters a geofenced perimeter). The service provider computing system 220 may further receive user information, generate a service list based on the user information, and provide information regarding the service list to service personnel (e.g., to a user device 210 of the service personnel).

The external user information server 230 may include one or more computing devices that from which user information may be obtained. For example, external user information server 230 may include servers associated with social media networks, electronic health records, user calendar information, etc. Information stored by the external user information server 230 may be accessed for building a user profile which is used to generate a service list for the user.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
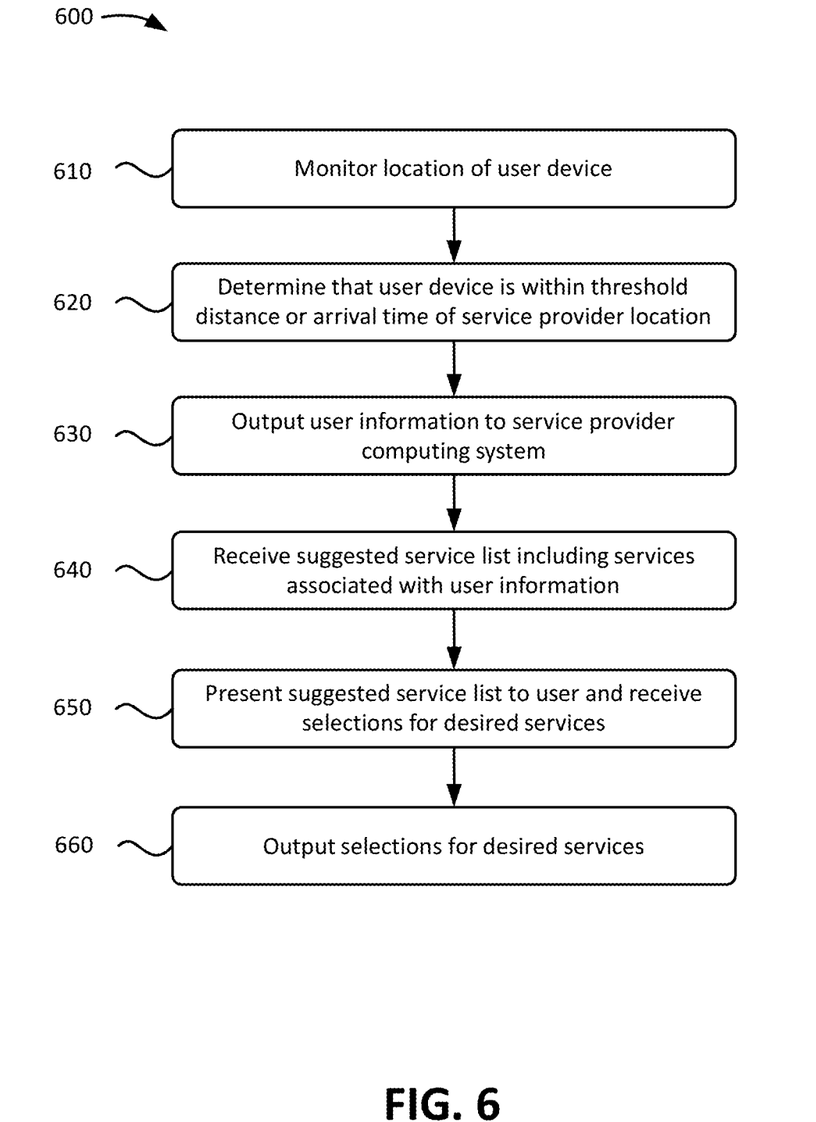
FIG. 6 shows an example flowchart for outputting user information to a service provider computing system as the user is en route to the service provider's location in accordance with aspects of the present invention.

FIG. 6 shows an example flowchart for outputting user information to a service provider computing system as the user is en route to the service provider's location in accordance with aspects of the present invention. The steps of FIG. 6 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 6, process 600 may include monitoring a location of a user device (step 610). For example, the service request application 215 of the user device 210 may monitor the location of the user device 210 (e.g., using GPS techniques) when the user of the user device 210 opens the service request application 215 (e.g., via user input on a user interface of user device 210). As an example, the user may open service request application 215 when the user is en route to the service provider's location. Further, the user may indicate using the service request application 215 that the user is en route to the service provider location, and the service request application 215 may monitor the location of user device 210 based on this indication. For example, the user may input a destination address corresponding to the service provider location. In embodiments, the service request application 215 may monitor the location of user device 210 without user interaction. For example, the service request application 215 may store or access information indicating the user's plans to visit a service provider (e.g., a hotel), and may begin monitoring the location of the user device 210 beginning at a threshold time before the user is planning to visit the service provider. As an example, the service request application 215 may access the user's calendar, social media information, and/or other information to determine that the user is planning on staying at a hotel at a particular date and time. The service request application 215 may begin monitoring the location of the user device 210 at a threshold time before when the user plans on initially checking in to the hotel. Further, the service request application 215 may determine that the user is en route to the service provider's location by monitoring the location of the user device 210 and determining, based on the location monitoring, that the user device 210 is traveling towards the service provider's location.

Process 600 may further include determining that the user device is within a threshold distance or arrival time of the service provider location (step 620). For example, the service request application 215 of the user device 210 may determine that the user device 210 is within a threshold distance of the service provider location (e.g., within a configurable geofence). Additionally, or alternatively, the service request application 215 may detect that the user device 210 is within a threshold arrival time of the service provider location (e.g., based on the user's travel speed, traffic conditions, etc.). In embodiments, the threshold distance and/or the threshold arrival times may be preconfigured, editable, and/or based on user and/or service provider preferences.

Process 600 may further include outputting user information to the service provider computing system (step 630). For example, the service request application 215 of the user device 210 may output user information (e.g., a user profile) to the service provider computing system 220 based on determining that the user device 210 is within the threshold distance of the service provider's location or facility. Additionally, or alternatively, the service request application 215 of the user device 210 may output user information based on determining that the user is en route to the service provider location (e.g., as described above with respect to step 610). In embodiments, the service request application 215 may output the user information via an API of the service request application 215. As described herein, the user profile may be populated in advance by the user. Additionally, or alternatively, the service request application 215 may provide the user with an opportunity to add information relating to requested services (e.g., when the user is within a threshold distance or arrival time of the service provider location). In embodiments, the user profile may be based on historical user activity, preferences, previously requested services, health records, and/or other information regarding the user that the user has permitted to be included in the user profile. For example, the service request application 215 may store the user profile information and/or obtain the user profile information from the external user information server 230.

Additionally, or alternatively, the user profile may include structured or parsed text (e.g., from the user's social media profile) that may indicate services that user may wish to receive from the service provider. As an illustrative example, the user profile may include information that indicates that the user is traveling with small children (e.g., based on a social media posting stating "traveling to San Francisco with the twins"). In this example, the text may indicate that the user may wish to receive child travel assistance (e.g., strollers, luggage assistance, etc.).

As described herein, multiple user profiles may be consolidated or linked, and consolidated user information for a party may be provided to the service provider computing system 220. For example, user profiles of users associated with different user devices 210 may be linked when the user devices 210 are within a threshold proximity of each other and both traveling to a service provider (e.g., based on GPS information from the user device 210, Bluetooth signal triangulation, NFC techniques, etc.). Additionally, or alternatively, user profiles for users who frequently travel together may be linked. For example, if user A frequently travels with user B (e.g., as identified by user profiles for user A and user B indicating the travel patterns of user A and user B), the profiles for user A and user B can be linked such that the preferences of both users are accommodated upon the arrival of user A and user B to a service provider. In embodiments, the service request application 215 may provide an interface via which user input may be received to manually link multiple user profiles.

In embodiments, the user information may be outputted to an emergency medical service provider (e.g., in a situation in which the user information indicates that the user is a patient in need of medical services). For example, a determination may be made that a user is a medical patient based on the user's location and destination (e.g., as inputted by the user). Further, the user may provide a confirmation that the user is a patient seeking medical attention (e.g., via a user interface of the service request application 215). In this way, emergency medical service providers may be better prepared to receive the patient.

In embodiments, the user's location may be shared with the service provider computing system 220 so that service provider personnel can prepare to greet the user upon the user's arrival to the service provider location. For example, the user device 210 may stream location information (e.g., GPS data) to the service provider computing system 220 so that the service provider computing system 220 may track the location of the user. In embodiments, the user information may include vehicle information and/or parking space location information so that the service provider personnel can prepare to greet the user upon the user's arrival to the parking space location. Further, the user information may include the user's estimated time of arrival to the service provider location. Also, the user information may include the user's contact information (e.g., mobile phone number) so that service provider personnel may contact the user to discuss the user's requested services.

Process 600 may also include receiving a suggested service list including services associated with the user information (step 640). For example, the user device 210 may receive the suggested service list from the service provider computing system 220. In embodiments, the suggested service list may be displayed via the service request application 215. As described herein, the suggested service list may be based on the user information. For example, the suggested service list may include services explicitly requested by the user (e.g., escorting from a parking lot to the service provider's facility entrance), medical services based on the user's health conditions (e.g., providing of a wheelchair, walker, crutches, and/or other medical equipment), luggage assistance based on user information indicating the amount of luggage with which the user may have traveled, child strollers based on user information indicating that the user has traveled with children, etc.

Process 600 may further include presenting the suggested service list to the user and receiving selections for desired services (step 650). For example, the user device 210 may display the suggested service list as individually selectable options in a user interface, and receive selections for desired services from the user via the service request application 215. In embodiments, the selections may include one or more of the services from the suggested service list as described at step 640. For example, the user may accept or deny particular suggested services that are displayed via the user interface. Additionally, or alternatively, the user may select to add services.

Process 600 may also include outputting selections for desired services (step 660). For example, the user device 210 may output the selections for the desired services to the service provider computing system 220. Service personnel may use the selections to prepare for the user's arrival to the service provider location. For example, the service provider personnel may prepare for the user's arrival by deploying the resources and/or equipment required to fulfill the user's requests.

In embodiments, one or more process steps from process 600 may be omitted. For example, once the user information has been output to the service provider computing system 220 (step 630), process 600 may end. Further, as described herein, service request application 215 may monitor the location of the user device 210 (at step 610) without receiving an instruction from the user to do so. In this way, the user's information may be automatically provided to the service provider computing system 220 without the need for the user to interact with the user device 210, and service provider personnel can use the user's information to better serve the user when the user arrives at the service provider's location.

Figure 7:
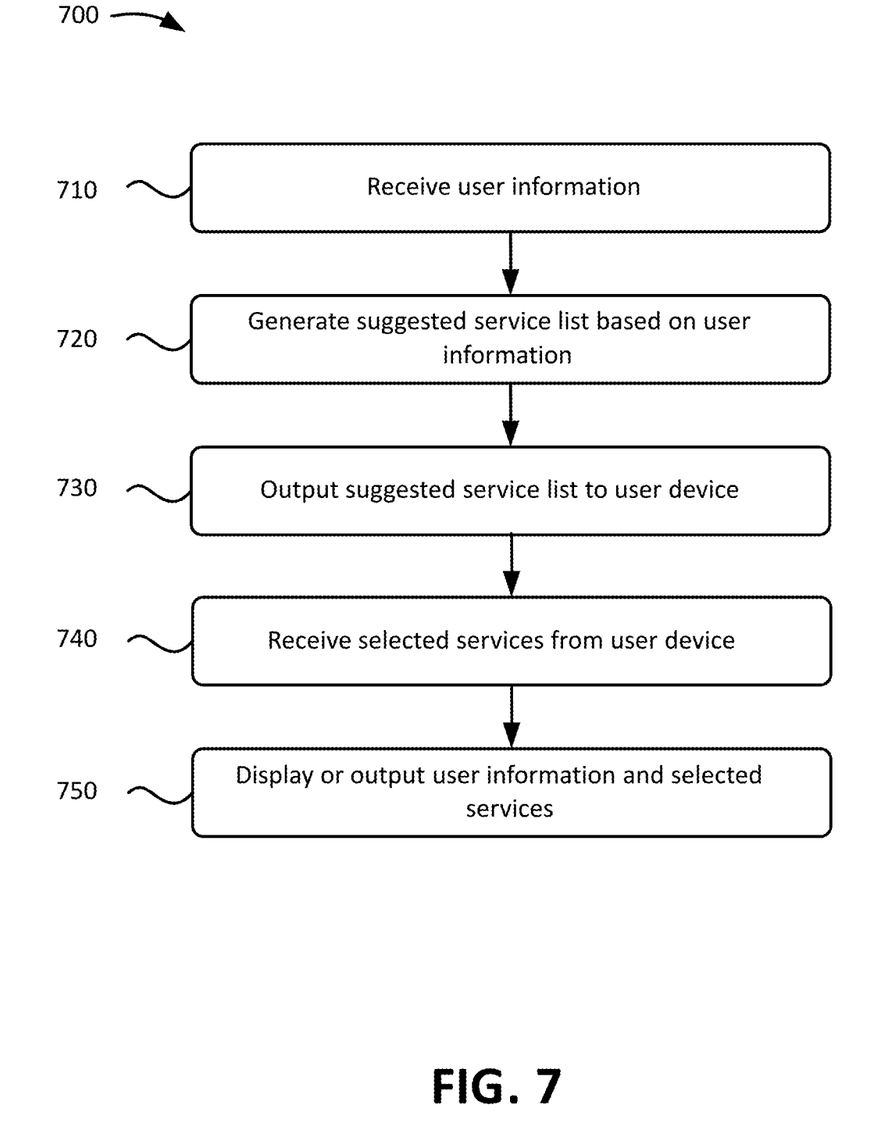
FIG. 7 shows an example flowchart for receiving user information in preparation for a user's arrival to a service provider location in accordance with aspects of the present invention.

FIG. 7 shows an example flowchart for receiving user information in preparation for a user's arrival to a service provider location in accordance with aspects of the present invention. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 may include receiving user information (step 710). For example, the service provider computing system 220 may receive the user information from the user device 210 (e.g., as described above with respect to step 630). Process 700 may further include generating a suggested service list based on the user information (step 720). For example, the service provider computing system 220 may generate the suggested service list based on the user information. As described herein, the service provider computing system 220 may match user information to services. For example, user information indicating that the user is traveling with children may be matched to a service to provide child strollers. Further, user information indicating that the user is immobile (e.g., health records, etc.) may be matched to a service to provide a wheelchair. In embodiments, the user information may identify requested services, and the service provider computing system 220 may include the requested services in the suggested service list. In embodiments, the service provider computing system 220 may identify services that the user has previously received, and include previously received services in the suggested service list. For example, over the course of time, the service provider computing system 220 may track and store information identifying the services that the user has previously received.

Process 700 may also include outputting the suggested service list to the user device (step 730). For example, the service provider computing system 220 may output the suggested service list to the user device 210, and the user device 210 may output selections for desired services, as described above with respect to process steps 650 and 660. Process 700 may further include receiving selected services from the user device 210 (step 740). For example, the service provider computing system 220 may receive the selected services from the user device 210, and may display or output the user's information and the selected services (step 750). For example, the service provider computing system 220 may output the user's information to a service provider's user device 210. The user's information may include the user's real-time location so that the service provider may track the user's location in order to greet the user when the user arrives at the service provider location. Additionally, or alternatively, the service provider computing system 220 may display the user information and/or selected services.

In embodiments, one or more process steps from process 700 may be omitted or modified. For example, step 720-740 may be omitted when the user information (at step 710) identifies requested services. In this way, the service provider computing system 220 may simply receive the user information, and display or output the user information and the requested services. Further, certain steps of process 700 may be performed by the user device 210. For example, the user device 210 may generate the service list based on the user information, and may output the service list to the service provider computing system 220 (e.g., when the user device 210 is within a threshold arrival time or distance from the service provider location).

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
monitoring, by a user device, a location of the user device;
determining, by the user device and based on the monitoring, that a user is within a threshold distance or a threshold arrival time of a service provider location; and
outputting, by the user device, user information to the service provider based on the determining that the user is within the threshold distance of the threshold arrival time of the service provider location, and includes linking information regarding multiple users through a computer network and outputting the information regarding multiple users,
wherein the user information indicates services to provide to the user by the service provider upon the user's arrival to the service provider location,
wherein the linking the information regarding multiple users includes determining that the multiple users are within a threshold proximity of each other via at least one from the group consisting of Bluetooth communication and near field communication (NFC);
generating, by a service provider device, a suggested service list based on the user information;
outputting, by the service provider device, the suggested service list to the user device;
receiving, by a service provider device, selected services based on outputting the suggested service list;
displaying or outputting, by the service provider device, the user information or the received selected services for serving the user upon the user's arrival to the location or facility of the service provider.

2. The method of claim 1, further comprising:
receiving a suggested service list based on outputting the user information to the service provider;
displaying the suggested service list via a user interface (UI) of the user device;
receiving user selections, via the UI, to accept or deny services in the suggested service list; and
outputting the user selections for desired services to the service provider.

3. The method of claim 1, wherein the user information includes information regarding services previously obtained by the user or information included in a calendar of the user.

4. The method of claim 1, wherein a solutions integrator at least one of creates, maintains, deploys and supports a computing system for receiving the user information.

5. The method of claim 1, wherein steps of claim 1 are provided by a solutions integrator provider on a subscription, advertising, and/or fee basis.

6. The method of claim 1, wherein the user device includes software provided as a service in a cloud environment.

7. The method of claim 1, wherein the monitoring the location of the user device comprises monitoring the location of the user device when a service request application is opened by a user of the user device.

8. The method of claim 7, further comprising receiving an indication that the user is en route to the service provider location via the service request application.

9. The method of claim 8, wherein receiving the indication that the user is en route to the service provider location comprises receiving an address of the service provider location via a user interface of the user device.

10. The method of claim 7, wherein the service request application begins monitoring the location of the user device at a threshold time before the user leaves for the service provider location.

11. The method of claim 7, wherein the monitoring the location of the user device includes monitoring at least one from the group consisting of the user's calendar and the user's social media information.

12. A computer program product for providing a service to a user upon the user's arrival to a service provider location the computer program product comprising a computer readable storage medium having program instructions embodied therewith, the program instructions executable by a user device to cause the user device to:
monitor a location of the user device;
determine, based on the monitoring, that a user of the user device is en route to a service provider location; and
output user information to the service provider based on the determining that the user is en route to the service provider location, and linking information regarding multiple users through a computer network and outputting the information regarding multiple users,
wherein the user information indicates services to provide to the user by the service provider upon the user's arrival to a location or facility of the service provider location, and
wherein the linking information regarding multiple users includes determining that the multiple users are within a threshold proximity of each other via at least one from the group consisting of Bluetooth communication and near field communication (NFC);
the outputting causes the service provider to receive the user information and generate a suggested service list based on the user information;
receive the generated suggested service list from the service provider; and
send selected services based on the received suggested service list to the service provider.

13. The computer-program product of claim 12, wherein the program instructions further cause the user device to:
determine that the user is within a threshold distance of the location or facility of the service provider,
wherein the outputting the user information to the service provider is further based on determining that the user is within the threshold distance of the location or facility of the service provider.

14. The computer-program product of claim 12, wherein the program instructions further cause the user device to determine that the user is within a threshold arrival time of the location or facility of the service provider,
wherein outputting the user information to the service provider is further based on determining that the user is within a threshold arrival time of the location or facility of the service provider.

15. The computer-program product of claim 12, wherein the user information includes at least one of:
user name;
user contact information;
user health information;
user luggage information; and
services requested by the user.

16. The computer-program product of claim 12, wherein the services include at least one of:
a luggage assistance service;
a vehicle parking service;
a medical assistance service;
a child assistance service;
an accompaniment service; and
a service requested by the user.

17. The computer-program product of claim 12, wherein the program instructions further cause the user device to:
receive a suggested service list based on outputting the user information to the service provider;
display the suggested service list via a user interface (UI);
receive user selections, via the UI, to accept or deny services in the suggested service list; and
output the user selections to the service provider.

18. The computer-program product of claim 12, wherein the linking the information regarding multiple users includes receiving user input that the multiple users are associated with each other.

19. A system comprising:
a CPU, a computer readable memory and a computer readable storage medium associated with a computing device;
program instructions to receive user information from a user device,
wherein the user information indicates services to provide to a user by a service provider upon the user's arrival to a location or facility of the service provider,
wherein the information is received when the user device is within a threshold distance or a threshold arrival time of the location or facility of the service provider;
program instructions to generate a suggested service list based on the user information;
program instructions to output the suggested service list to the user device;
program instructions to receive selected services based on outputting the suggested service list;
program instructions to display or output the user information or the received selected services for serving the user upon the user's arrival to the location or facility of the service provider;
wherein the receiving the user information includes received linked information regarding multiple users through a computer network and receiving the information regarding multiple users;
wherein the linking the information regarding the multiple users includes determining that the multiple users are within a threshold proximity of each other via at least one from the group consisting of Bluetooth communication and near field communication (NFC); and
wherein the program instructions are stored on the computer readable storage medium for execution by the CPU via the computer readable memory.

20. The system of claim 19, wherein generating the suggested service list includes at least one of:
matching the user information to suggested services, and
identifying services that the user has previously received.

* * * * *